Dec. 1, 1970   J. S. PENNINGTON   3,544,131
IMPLEMENT FRAME

Filed Oct. 23, 1968   2 Sheets-Sheet 1

INVENTOR.
JOE S. PENNINGTON
BY *William A. Murray*
ATTORNEY

INVENTOR.
JOE S. PENNINGTON

United States Patent Office 3,544,131
Patented Dec. 1, 1970

3,544,131
IMPLEMENT FRAME
Joe S. Pennington, Tuckerman, Ark., assignor to Deere & Company, Moline, Ill., a corporation of Delaware
Filed Oct. 23, 1968, Ser. No. 769,779
Int. Cl. B62d 53/00
U.S. Cl. 280—412                    5 Claims

ABSTRACT OF THE DISCLOSURE

An agricultural implement frame having two independently supported subframes with front and rear connections to maintain them in side-by-side relation for field-working purposes, the front connection being releasable to allow one subframe to pivot about the rear connection to a trailing position directly behind the other subframe for transport purposes.

BACKGROUND OF THE INVENTION

The present invention relates generally to agricultural implements and more particularly to a framework for agricultural implements movable between a wide field-working position and a narrow transport position.

One of the current trends in farm equipment is toward larger and wider ground-working implements whereby a strip of maximum width can be worked on each pass through the field. Although the maximum working width of such implements is primarily limited only by the ability of the tractor to pull it through the ground, the maximum transport width is limited by the width of existing roadways, gateways, and the like. It is thus desirable to provide an implement frame having a substantial operating or working width, yet one which, at the same time, may be converted to a narrower width suitable for transport purposes. Although a number of attempts have heretofore been made to provide such an implement frame, these prior art devices are in general characterized by excessive complexity, prohibitive cost, and undue difficulty of operation.

SUMMARY OF THE INVENTION

The novel implement frame of the present invention comprises generally a pair of subframes which are adapted to travel in side-by-side relation for normal field-working operations and in fore-and-aft relation for transport purposes. Each of the subframes is supported by a pair of ground wheels which may be raised and lowered by means of a hydraulic cylinder.

When disposed in side-by-side relation, the subframes are connected at two points, one being forwardly on the subframes and the other being substantially rearwardly of the subframes proper. One of the subframes is provided with a hitch member which may be swung between a field-working position, in which the tractor attaching point on the end of the member is disposed generally on the longitudinal center line of the left and right subframe combination, and a transport position, in which the attaching point is disposed on the longitudinal center line of that subframe on which the hitch member is mounted. The member is held in either position by a retaining pin, and may be swung from one to the other by merely removing the pin, driving the tractor in the desired direction, and replacing the pin.

The frame is converted from its field-working position to its transport position by first swinging the hitch member to its transport position and locking it in place, then releasing the front connection between the two subframes, driving the tractor in a forwardly direction, and allowing the subframe without the hitch member to swing about its rear connection with the other subframe to a trailing position directly behind the latter. For this purpose, the rear connection between the subframes is one which will allow universal relative movement, such as a ball and socket joint. The implement frame is reconverted to its field-working position by merely reversing the above procedure.

DESCRIPTION OF THE PREFERRED EMBODIMENT

In the following description, right- and left-hand reference is determined by standing at the rear of the implement frame and facing in the direction of travel.

Figure 2:
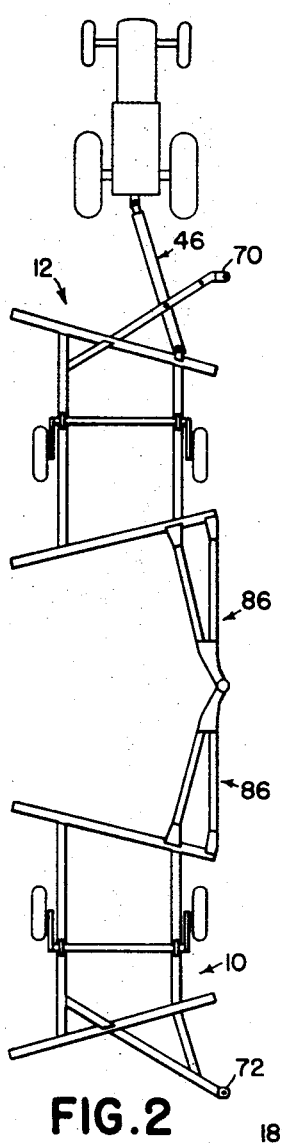
FIG. 2 is a plan view of the implement frame in its transport position.
Figure 1:
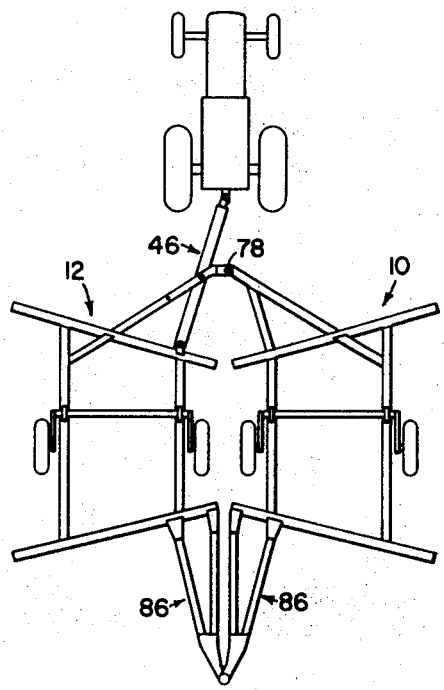
FIG. 1 is a plan view of the implement frame of the present invention in its ground-working or normal operating position.

Referring now to the drawings, the implement frame of the present invention includes, generally, right and left subframes 10 and 12, respectively, which are adapted to travel in side-by-side relation for field-working purposes, illustrated in FIG. 1, and in fore-and-aft relation for transport purposes, illustrated in FIG. 2. As is apparent from the drawings, the two subframes 10 and 12 are essentially mirror images of one another, with certain exceptions which will be noted in the following description.

Figure 3:
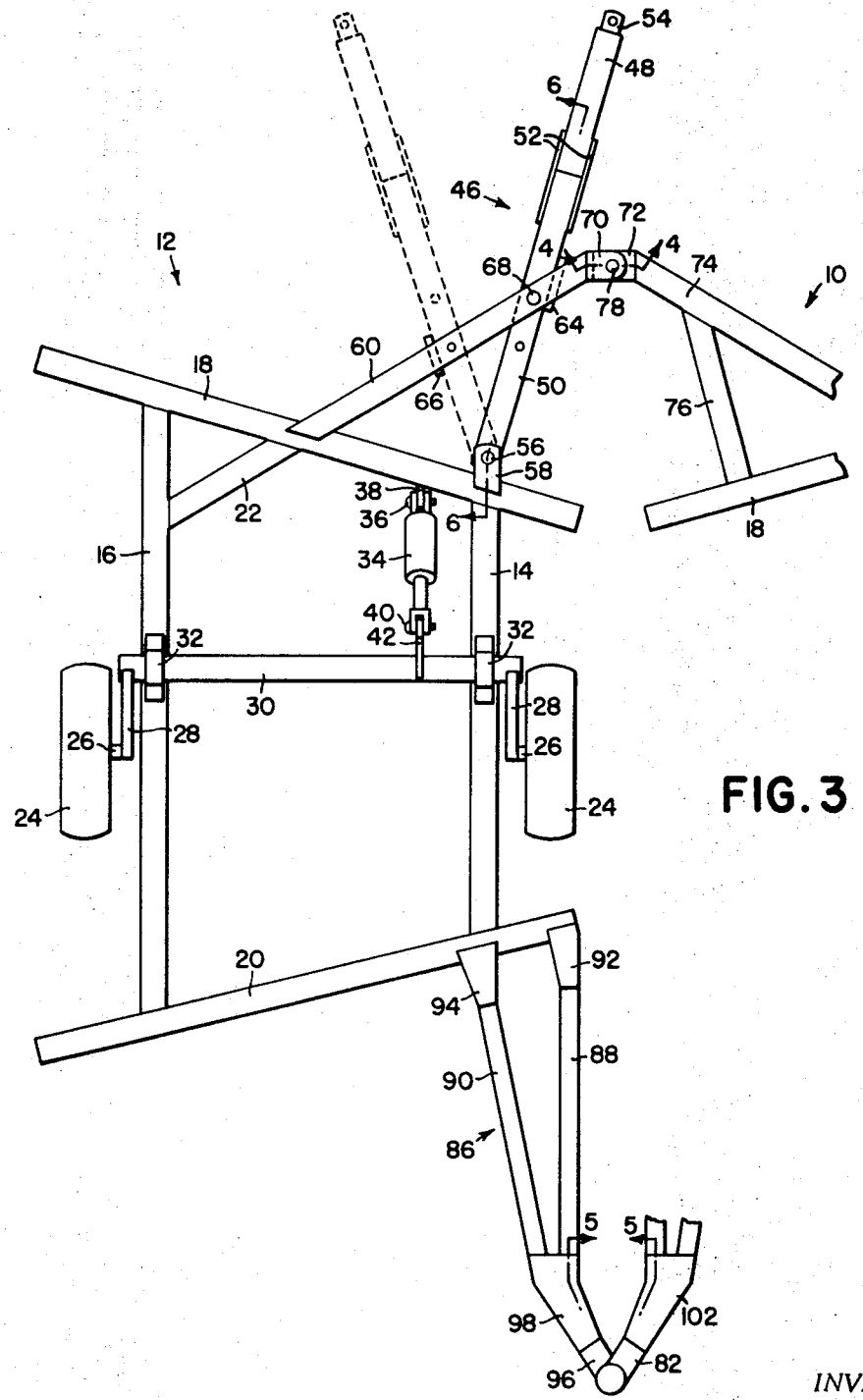
FIG. 3 is an enlarged plan view of the left subframe.

As shown best in FIG. 3, each subframe includes an inner and outer, longitudinally extending side frame members 14 and 16, respectively, each of which rigidly connects the inner and outer end portions of fore-and-aft, diagonally extending toolbar members 18 and 20 respectively. Front toolbar 18 is braced to the forward portion of side member 16 with short brace member 22. Although not shown in the drawings, a variety of earthworking tools such as disk gangs, cultivator shovels and the like, can be mounted on toolbars 18 and 20.

Each subframe 10, 12 is supported by a pair of ground wheels 24 disposed outwardly from side members 14, 16. Ground wheels 24 are mounted for rotational movement on stub axles 26 which are in turn rigidly fixed to the lower end of ground wheel support arms 28. A transversely extending rockshaft 30, journaled to the top side of members 14, 16 with U-shaped bearing caps 32, has support arms 28 rigidly secured to its ends and extending radially therefrom in parallel relation. A hydraulic cylinder assembly 34, supplied with hydraulic fluid under pressure from the hydraulic system of the tractor, is provided to rotate rockshaft 30 and thus raise and lower the subframes 10, 12 relative to the ground. The stationary or cylinder portion of cylinder assembly 34 is pivotally mounted by means of pin 36 on bracket 38 which is in turn rigidly fixed to the back side of toolbar member 18. The movable or piston end of cylinder assembly 34 is pivotally attached by means of pin 40 to the outer end of lift arm 42 which in turn is rigidly secured to and extends radially from rockshaft 30.

It should be apparent from the mechanism described that when cylinder assembly 34 is fully retracted, ground wheels 24 will be in their uppermost position, and the implement frame will be in its lowered or field-working position. Conversely, when cylinder assembly 34 is fully extended, ground wheels 24 will be in their lowermost position and the implement frame will be in its raised or transport position.

Figure 6:
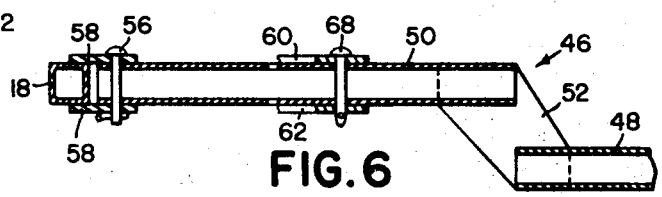
FIG. 6 is a section view of the hitch member taken along line 6—6 of FIG. 3.

As shown best in FIGS. 1–3, the implement frame of the present invention is attachable to a tractor by means of hitch member 46, pivotally mounted on left subframe 12 for movement between a field-working position, illustrated by the solid lines of FIG. 3, and a transport position, illustrated by the phantom lines of FIG. 3. Hitch member 46, illustrated in detail in FIG. 6, is composed of fore-and-aft members 48 and 50, respectively, which are rigidly connected in vertical offset relation by means of side plates 52. The forward end of member 48 has a hitch clevis 54 mounted therein for receiving a tractor drawbar. The rearward end of member 50 is pivotally mounted on pin 56 between upper and lower supports 58, which are in turn fixed to the top and bottom surfaces, respectively, of toolbar 18. Member 50 extends forwardly from this pivotal connection between upper and lower diagonally extending hitch member support arms 60 and 62 respectively. The range of horizontal swinging movement of hitch member 46 about pin 56 is defined by right and left stop blocks 64 and 66, respectively, rigidly mounted between support arms 60, 62. Left stop block 66 locates the transport position of hitch member 46, while right stop block 64 locates the field-working position of the hitch member. Pin 68, in cooperation with aligned holes in member 50 and support arms 60, 62, serves to lock hitch member 46 in either position.

Figure 4:
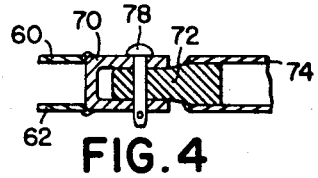
FIG. 4 is a section view of the front connection between the two subframes, taken along the line 4—4 of FIG. 3.

The front portions of the subframes 10 and 12 are provided with a single connection, shown best in FIGS. 3 and 4. U-shaped connecting bracket 70, comprising the left half of the connection, is rigidly secured to the outer ends of support arms 60, 62. Cooperating with bracket 70 on left subframe 12 to complete the front connection is pivot block 72 on right subframe 10. Block 72 is rigidly fixed to the outer end of arm 74, which extends diagonally from front toolbar 18 of right subframe 10 and is braced therewith by means of brace member 76. Vertically aligned apertures in U-shaped bracket 70 and block 72 are adapted to receive pin 78, which releasably secures the two members.

Figure 5:
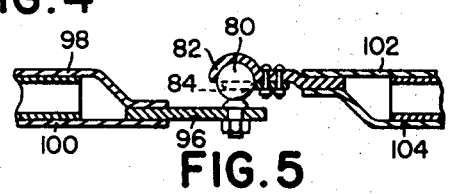
FIG. 5 is a section view of the rear connection between the two subframes, taken along line 5—5 of FIG. 3.

The rear connection between the subframes, a cross section of which is shown in FIG. 5, is a conventional-type ball and socket joint, formed by ball 80 on left subframe 12 cooperating with socket member 82 on right subframe 10. Retaining member 84, releasably secured to the underside of socket member 82, acts to prevent ball 80 from disengaging with socket member 82. Ball 80 and socket member 82 are mounted on the ends of rearwardly extending arms 86 which include, generally, inner and outer channels 88 and 90 respectively. Channels 88 and 90 are rigidly secured at their forward ends to rear toolbar 20 with the aid of brace plates 92 and 94 respectively. Ball 80 is mounted on bar 96 which in turn is held between upper and lower plates 98 and 100 respectively, upper plate 98 being offset vertically as shown in FIG. 5. Socket member 82 is held between upper and lower plates 102 and 104 respectively, lower plate 104 being offset vertically as also shown in FIG. 5.

When the implement frame is in its normal working position, illustrated in FIG. 1, the subframes 10, 12 are held in side-by-side relation by the above-described fore-and-aft connections, and hitch member 46 is locked against right stop block 64 such that hitch clevis 54 lies on the longitudinal center line of the implement frame. When in its transport position, illustrated in FIG. 2, hitch member 46 of the implement frame is locked against left stop block 66 such that hitch clevis 54 lies approximately on the longitudinal center line of left subframe 12, and subframe 10 is disposed in trailing position directly behind subframe 12. In this position, the rear ball and socket connection allows universal relative movement between the two subframes.

An important feature of the invention resides in the fact that arms 86 which support the ball and socket connection extend far enough from their mounting on rear toolbar 20 to allow the implement to negotiate a relatively sharp left-hand turn in its transport position without the rear toolbars 20 of the subframes 10, 12, or any tools mounted thereon, interfering with each other. The permissible turn angle between the subframes may be increased if desired by lengthening arms 86.

The procedure for changing the implement frame from its field-working position of FIG. 1 to its transport position of FIG. 2 involves a minimum of time and effort. Starting in the field-working position, the implement frame must first be raised to its transport height by extending cylinder assemblies 34. Next, pin 68, holding hitch member 46 in position against right stop block 64, and pin 78, connecting the forward portions of the subframes 10 and 12, are removed and the tractor is driven forwardly and to the left. This movement will cause hitch member 46 to swing to the left against left stop block 66, where it is then secured by means of pin 68, and right subframe 10 to swing outwardly from left subframe 12 about their rear pivotal connection. Continued forward movement of the tractor will cause subframe 10 to eventually assume the position directly behind subframe 12 illustrated in FIG. 2.

The procedure for changing the implement frame from its transport position back to its ground-working position involves essentially the same steps outlined above, though in reverse order: Pin 68 is first removed from hitch member 46 and the tractor is backed such that its drawbar moves to the right. This will cause hitch member 46 to swing back against right stop block 64 where it is then locked with pin 68, and right subframe 10 to pivot back into position alongside subframe 12, whereupon pin 78 may be reinserted to securely connect the two subframes.

A significant feature of the present invention resides in the fact that the left subframe 12 is essentially a self-contained frame unit, and it thus may be completely disconnected from the right subframe and used separately, as an offset disk harrow, for example. It would be necessary merely to remove pin 78 from the front connection, remove retaining member 84 from the rear connection, and secure hitch member 46 in its normal transport position. Right subframe 10 could likewise be utilized as a separate unit with the addition of a suitable hitch device.

An additional feature of the invention resides in the fact that two existing implement frames, such as two offset disk harrows, for example, may be utilized as the basic subframe components. The additional elements required, such as the swingable hitch member and the fore-and-aft connections, could be provided as an attachment for such existing frames.

I claim:

1. An implement frame comprising: a pair of subframes having front and rear portions, the subframes being relatively swingable between a wide operating position wherein the subframes are disposed in side-by-side relation, and a narrow transport position wherein the subframes are disposed in fore-and-aft relation with the rear subframe turned 180° from its operating position and having its rear portion in fore-and-aft opposed relation with the rear portion of the front subframe; first connection means acting between the front portions of the subframes for releasably maintaining the subframes in their operating position; a pair of rearwardly extending structures on the respective rear portions of the subframes and terminating rearwardly at a common point lying generally on the longitudinal centerline of the implement frame when the subframes are in their operating position; second connection means including a single vertical pivot between the rear terminal ends of the rearwardly extending structures, the second connection means being the sole connection between the subframes when in their transport position; the structures extending sufficiently rearward of the respective subframes to provide a large fore-and-aft open expanse between the opposing rear portions of the subframes when in their transport position, whereby when said first connection is released, the subframes are free to swing relative to each other through a substantial horizontal angle on either side of the longitudinal centerline passing through the rear terminal ends of the rearwardly extending structures.

2. The implement frame described in claim 1 further including hitch means mounted on the forward portion of one of the subframes, the hitch means including tractor attaching means shiftable between a first position, wherein the attaching means lies generally on the longitudinal centerline of the implement frame when the subframes are in their operating position, and a second position, wherein the attaching means lies generally on the longitudinal centerline of the implement frame when the subframes are in their transport position.

3. The implement frame described in claim 2 wherein the hitch means further includes an elongated hitch member having the tractor attaching means on one of its ends, the hitch member being swingably mounted on the one subframe at its other end to shift the tractor attaching means between its first and second positions.

4. The implement frame described in claim 1 wherein the second connection means further includes transverse and fore-and-aft pivots between the rear terminal ends of said rearwardly extending structures.

5. An implement frame comprising: a pair of subframes independently supported relative to the ground; first connection means releasably connecting said subframes in a side-by-side relation; second connection means spaced from said first conncetion means and pivotally connecting said subframes whereby said subframes are swingably between said side-by-side relation and a fore-and-aft relation when said first connection means is released; an elongated hitch member pivotally mounted at one of its ends on the forward portion of one of said subframes; and tractor attaching means on the opposite end of said hitch member and swingable therewith between a first position, in which said attaching means lies generally on the longitudinal centerline of the implement frame when said subframes are in said side-by-side relation, and a second position, in which said attaching means lies generally on the longitudinal centerline of the implement frame when said subframes are in said fore-and-aft relation.

References Cited
UNITED STATES PATENTS

| | | | |
|---|---|---|---|
| 3,135,337 | 6/1964 | Morris | 172—44 |
| 3,190,363 | 6/1965 | Morris | 172—44 |
| 3,064,996 | 11/1962 | Roppel | 280—412 |
| 3,387,861 | 6/1968 | Bauman | 280—412 |
| 3,414,064 | 12/1968 | Foster | 280—413 X |
| 3,419,284 | 12/1968 | Tibbals | 280—412 |

LEO FRIAGLIA, Primary Examiner

U.S. Cl. X.R.

172—311